Dec. 30, 1947. L. L. HOWARD Re. 22,954

METHOD OF MAKING MICA RINGS

Original Filed Oct. 28, 1940 2 Sheets-Sheet 1

Inventor:
Leonard L. Howard
by his Attorneys
Howson & Howson

METHOD OF MAKING MICA RINGS

Original Filed Oct. 28, 1940 2 Sheets-Sheet 2

Inventor:-
Leonard L. Howard
by his Attorneys
Howson & Howson

Reissued Dec. 30, 1947

Re. 22,954

UNITED STATES PATENT OFFICE 22,954

METHOD OF MAKING MICA RINGS

Leonard L. Howard, Valparaiso, Ind., assignor to Continental-Diamond Fibre Company, Newark, Del., a corporation of Delaware Original No. 2,277,590, dated March 24, 1942, Serial No. 363,198, filed October 28, 1940. Application for reissue filed August 22, 1947, Serial No. 770,059

10 Claims. (Cl. 154—2.6)

This invention relates to a method of manufacturing commutator rings and other annular or arcuate bodies having a flange or flanges.

Commutator rings, for example, comprise a radial cross-section including a main, substantially cylindrical body portion having at one edge thereof an internal V-shaped flange one wing of which is connected to the body portion at an acute angle. The usual practice in manufacture of these rings is to provide strips substantially equal in length to the circumference of the proposed ring and to notch that edge of the ring which is to be subsequently formed into the internal V-shaped rib with which the ring is provided. The material employed in the construction of the ring is usually mica bonded with a suitable bonding agent such as shellac, copal, manila gum, a natural resin, or a synthetic resin of suitable type, for example, a Glyptal resin. These rings are placed in a mold in sufficient number to build up the commutator to the desired thickness, following which they are bonded and cured by heat and pressure. This method of manufacture is disadvantageous due to the fact that the sharp angle between the flange and body of the ring results in such severe deformation of the sheets that breakage of the mica in the sheets results. Furthermore, such sheets cannot be readily formed to the contours of the mold, and there is, accordingly, an additional tendency to breakage due to the drag of the walls of the mold as the sheets are moved by the internal plunger of the mold into their final position. Furthermore, the notching of the edges of the sheet often results in disposition of the cuts between adjacent teeth overlying one another in such fashion that the dielectric strength of the assembly is greatly reduced.

The primary purpose of the present invention is the provision of a method of manufacturing such rings whereby such weaknesses are eliminated and the dielectric strength of the ring, accordingly, increased.

Another object of the invention is the provision of a method which will enable the rings to be cheaply and, at the same time, accurately constructed.

These and other objects I attain by the method various steps of which are illustrated in the accompanying drawings in which Fig. 1 is a plan view of one of the primary sections employed in the construction of a ring in accordance with my invention;

Figure 1:
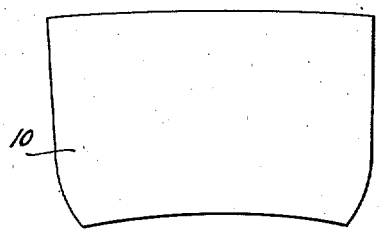
Figure 2:
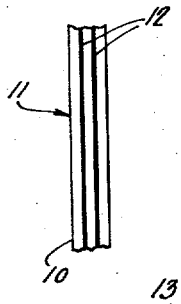
Fig. 2 is a fragmentary edge elevation of a layout preceding initial formation of the section shown in Fig. 1.
Figure 3:
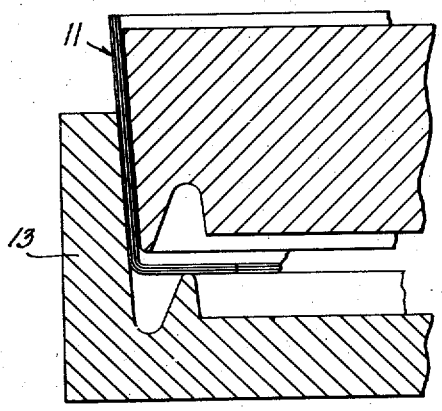
Fig. 3 is a fragmentary sectional view illustrating the primary formation of the sections.
Figure 4:
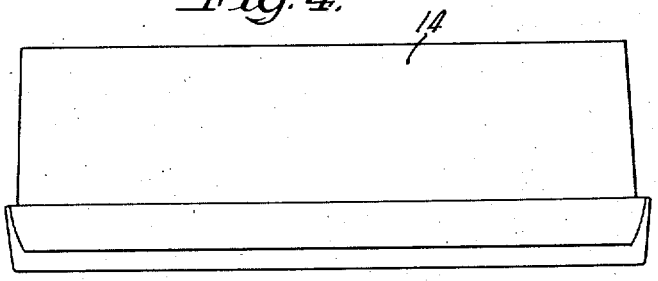
Fig. 4 is a front elevation of a formed section.
Figure 5:
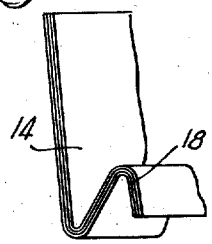
Fig. 5 is a fragmentary perspective of a formed section.

In accordance with my method, primary sections 10, such as that shown in Fig. 1, are produced from a prepared sheet or plate composed of mica and a suitable binder, by any convenient process such, for example, as by punch pressing. A plurality of these sheets is then laid up to form a slab 11, sheet mica, unassociated with binder, indicated at 12 being placed between adjacent faces of the individual sections to prevent adherence during the following step of the process. This slab is then heated to slightly soften the binder and to "prime" the contained mica for the next step of the process, as I have found that if a mica slab of this type is heated and placed in a cold die, there is sufficient movement (draw) possible in the mica plate or section to enable proper shaping of the V-shaped flange 18 without tearing such as results in loss of dielectric strength in the section, it being understood that the slabs are made of a length such that disruptive strains are not set up in the flange section. The slabs are then placed in a suitable cold press 13, as shown in Fig. 3, and formed into rough sections such as shown at 14 in Figs. 4 and 5.

Figure 6:
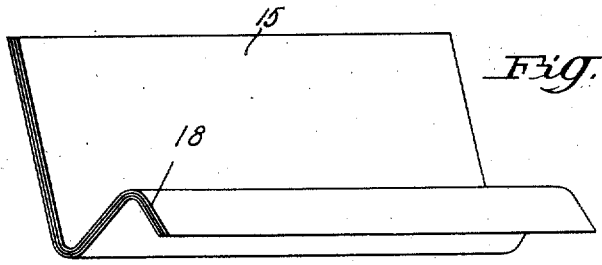
Fig. 6 is a perspective view of the section after forming and trimming thereof.
Figure 8:
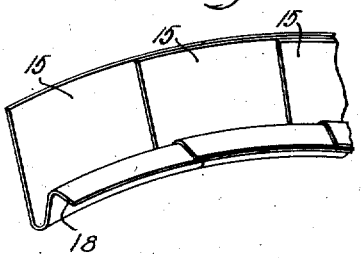
Fig. 8 is a fragmentary perspective showing the method of laying up the formed sections in preparation to final molding of the ring.
Figure 7:
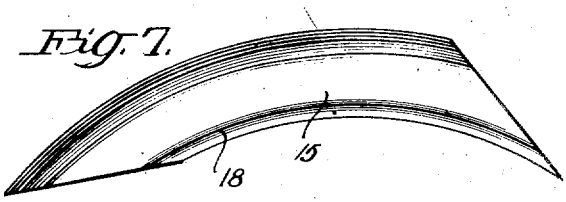
Fig. 7 is a plan view of the formed and trimmed section.
Figure 9:
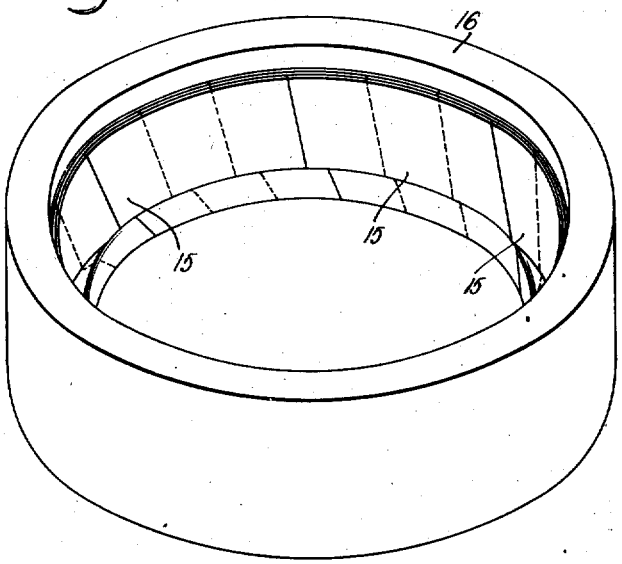
Fig. 9 is a perspective view of the mold showing the sections in position therein prior to the final molding.
Figure 10:
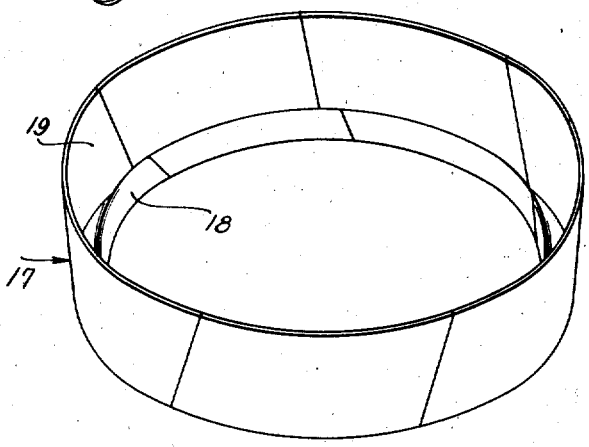
Fig. 10 is a perspective view of a completed ring.

These rough sections are then trimmed to the proper shape, as shown at 15 in Figures 6 and 7, the end edges being preferably made tangential to a circle concentric with but smaller than the mean internal diameter of the completed ring, following which the individual sections of the slab are separated, as shown in Figure 8, and placed in a finishing mold 16. In placing the sections in the mold, the edges of adjacent strips are staggered with relation to one another so that in a "three-deep" ring the solid body of at least two sections will be present at any point in the circumference of the completed ring. The assembled sections are then subjected to heat and pressure to effect the final curing thereof.

It will be noted that by following this method there can be accurate control of the disposition of separated portions of the ring which will render it possible to positively avoid any such weaknesses as occur as a result of overlap of notched edge in the normal process. It will also be noted that, by employing the preforming step, the weakness of the completed ring 17 at the joinder of the internal V-shaped flange 18 and the side wall 19 is eliminated.

While the foregoing has been directed entirely to the description of a flanged ring, it will, of course, be understood that the invention is equally applicable to the production of any segmental flanged wall as well.

Since the method as described is obviously capable of modification, I do not wish to be understood as limiting myself to the specific steps hereinbefore set forth except as hereinafter claimed.

I claim:

1. The method of manufacturing flanged rings or segments, comprising forming plates consisting of mica and a binder to a size to form a unit segment of the completed article, assembling a plurality of such plates into a slab with interposed sheets of a material preventing adherence of the plates, heating the slab to soften the binder to render said plates formable and thereafter forming the slab to the desired cross-sectional and circumferential shape, separating the individual plates and laying the plates up in a mold in layers in which the joints of the plates of one layer are staggered with relation to those of remaining layers of the ring, and subjecting the assembly thus provided to heat and to pressure to form the completed article.

2. The method of forming flanged rings or segments, comprising forming a plurality of plates each composed of mica and a binder, preforming said plates into a plurality of unit segments by heating said plates to soften the binder to render said plates formable and thereafter forming them to the desired cross-sectional and circumferential shape, said unit segments being thinner than the desired thickness of the completed article, laying up said unit segments in a mold in layers to the desired thickness while staggering the joints of the unit segments of each layer with relation to the joints between unit segments of adjacent layers, and subjecting the assembly to pressure and to heat to unify the structure.

3. The method according to claim 2, wherein the heated plates are preformed to the desired shape by cold-pressing them.

4. The method of forming flanged rings or segments, comprising forming a plurality of unnotched plates each composed of mica and a binder, preforming said plates into a plurality of unit segments by heating said plates to soften the binder to render said plates formable and thereafter cold-pressing them to the desired cross-sectional and circumferential shape, said unit segments being thinner than the desired thickness of the completed article, laying up said segments in a mold in layers to the desired thickness while staggering the joints of the unit segments of each layer with relation to the joints between unit segments of the remaining layers, and subjecting the assembly to pressure and to heat to unify the structure.

5. The method of manufacturing rings or segments having an acutely related flange, comprising forming plates of a size to form a unit segment consisting of mica and a binder curable by pressure and heat, assembling a plurality of such plates into a slab with interposed sheets of a material preventing adherence of the plates, heating the slab to soften the binder to render said plates formable and thereafter lightly pressing the slab to produce the desired flange and side wall portions without curing the binder, separating the individual plates and laying the plates up in a mold in a layered ring in which the joints of the plates of one layer are staggered with relation to those of remaining layers of the article, and subjecting the assembly thus provided to heat and pressure to form the completed article and cure the binder.

6. The method of manufacturing flanged rings or segments having an acutely related flange, comprising forming unnotched plates of a size to form a unit segment consisting of mica and a binder curable by pressure and heat, assembling a plurality of such plates into a slab with interposed sheets of a material preventing adherence of the plates, heating the slab to soften the binder to render said plates formable, lightly cold-pressing the heated slab to produce the desired flange and side wall portions without curing the same to the insoluble infusible state, trimming the resultant product to provide a true unit segment, separating the individual plates and laying the plates up in a mold in layers in which the joints of the plates of one layer are staggered with relation to those of remaining layers, and subjecting the assembly thus provided to heat and pressure to form the completed article and cure the binder.

7. An article of manufacture consisting of mica and a binder of the type described, said article having a flanged arcuate wall including a plurality of layers of integrally united preformed unnotched unit segments, the joints between the segments of each layer being staggered with relation to those of adjacent layers.

8. An article of manufacture consisting of mica and a binder of the type described, said article having a flanged arcuate wall including a plurality of layers of integrally united preformed unnotched unit segments, the joints between the segments of each layer being staggered with relation to those of the remaining layers.

9. A commutator ring consisting of mica and a binder of the type described, said ring including a plurality of layers of integrally united preformed unnotched unit segments each having a continuous internally disposed V-shaped flange, the joints between the segments of each layer being staggered with relation to those of adjacent layers.

10. A commutator ring consisting of mica and a binder of the type described, said ring including a plurality of layers of integrally united preformed unnotched unit segments each having a continuous internally disposed V-shaped flange, the joints between the segments of each layer being staggered with relation to those of the remaining layers.

LEONARD L. HOWARD.